United States Patent [19]
Hancock et al.

[11] Patent Number: 5,890,639
[45] Date of Patent: Apr. 6, 1999

[54] MULTI-PURPOSE BAG SYSTEM

[76] Inventors: Dennis Hancock, 5752 N. Silverstone Cir., Mountain Green, Utah 84050; James C. Holloway, 1230 N. 225 East, Logan, Utah 84341

[21] Appl. No.: 23,189

[22] Filed: Feb. 13, 1998

[51] Int. Cl.[6] ........................................................ B60R 7/00

[52] U.S. Cl. .................. 224/429; 224/42.11; 224/42.15; 224/430

[58] Field of Search ............................. 224/42.11, 42.15, 224/153, 584, 585, 429, 430; 150/111, 117; 190/108; D3/231, 230

[56] References Cited

U.S. PATENT DOCUMENTS

| D. 234,326 | 2/1975 | Kato | D3/231 |
| 2,813,602 | 11/1957 | MacArthur, Jr. | 224/220 |
| 5,129,560 | 7/1992 | Herman | 224/579 |
| 5,410,762 | 5/1995 | Maskovich | 2/338 |
| 5,630,536 | 5/1997 | Bugnaski | 224/600 |

*Primary Examiner*—Stephen P. Garbe
*Assistant Examiner*—Maerena Bevard

[57] ABSTRACT

A multi-purpose bag system having a pair of pouch-type bags releasably attached to a resilient, reversible pad with a central opening for stretching over a raised post of a support structure.

5 Claims, 2 Drawing Sheets

MULTI-PURPOSE BAG SYSTEM

CROSS REFERENCE TO RELATED APPLICATIONS

Not applicable

STATEMENT REGARDING FEDERALLY SPONSORED RESEARCH OR DEVELOPMENT

Not applicable

REFERENCE TO A MICROFICHE APPENDIX

Not applicable

BACKGROUND OF THE INVENTION

This invention relates to multi-purpose bag systems and is particularly related to saddle bags and belt mounted bags used for holding diverse objects.

BRIEF SUMMARY OF THE INVENTION

Principal objects of the present invention are to provide a multi-purpose bag system capable of holding objects of varying configuration to a variety of support structures.

Other objects are to provide an economically produced multi-purpose bag system that will not scratch or mar objects gripped or a support structure or the support structure for the bag system, while securely holding objects placed in the bags of the bag system.

Still other objects are to provide a bag system that includes a pair of bags interconnected by a non-skid, reversible pad and with the bags connected to the pad in such a manner as to permit reversal of the pad without changing the orientation of the bags on the support structure and while allowing the pad to provide cushioning of the connectors between pad and bags against the support structure.

Yet other objects of the inventions are to provide a bag system with a pad that can be of different configurations to accommodate a support structure and wherein the bags, which may be of different configurations, will fit varying configurations of support structures.

Principal features of the invention include a pair of bags, each releasably connected to a shaped pad and each usable separately with belts or straps, should that be desired. The shaped pad is resilient and made of non-skid material and conforms generally to a support structure. A central opening through the pad stretches to fit snugly over a raised member, such as a motorcycle gas tank inlet and inlet cap, a saddle horn, or the like. Hook and loop members, such as those commonly known by the trademark "VELCRO" releasably interconnect a rear surface of each bag to the support structure and hold the bags tight against the support structure. The bags are easily connected to and removed from the shaped pad and can be easily reconnected after the shaped pad has been reversed, should that be desired, to change the appearance of the bag system on the support structure, while protecting the support structure against abrasive rubbing of the rings used to interconnect the pad and the bags.

Additional objects and features of the invention will become apparent to those skilled in the art to which the invention pertains from the following detailed description and drawings.

DETAILED DESCRIPTION OF THE INVENTION

Figure 1:
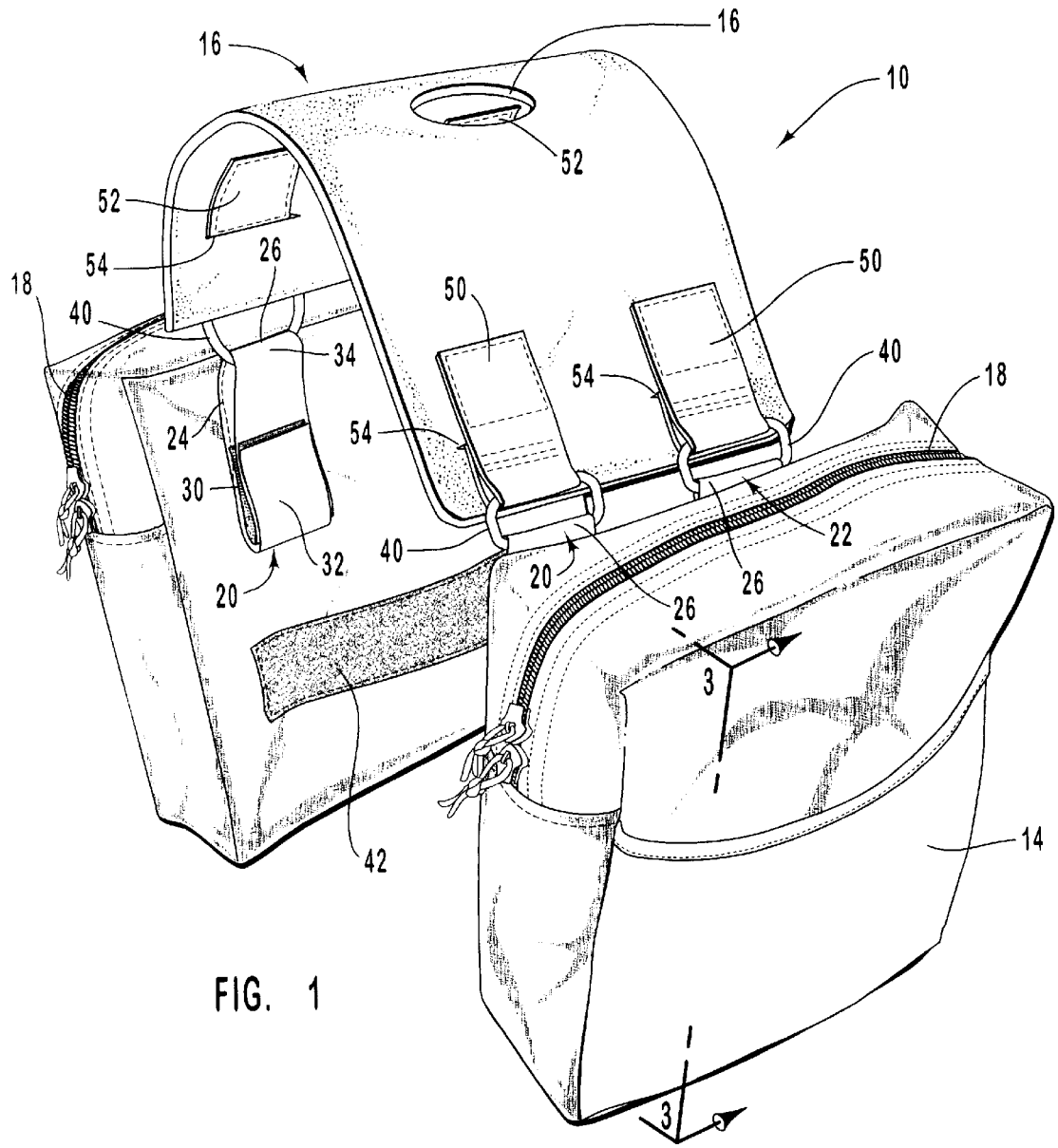
FIG. 1 is a pictorial view of the bag system of the invention, assembled and ready for use.
Figure 2:
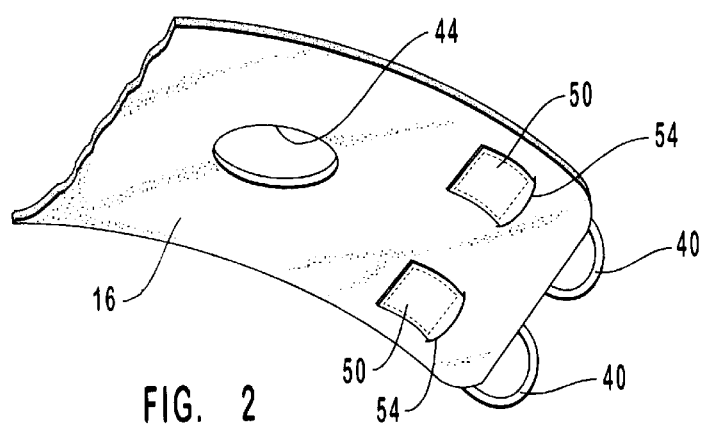
FIG. 2, a pictorial view of a portion of the shaped pad, reversed from the position shown in FIG, 1, and with the D-rings at one side of the pad pushed through slots provided therefor in the pad, to be connected to a bag.
Figure 3:
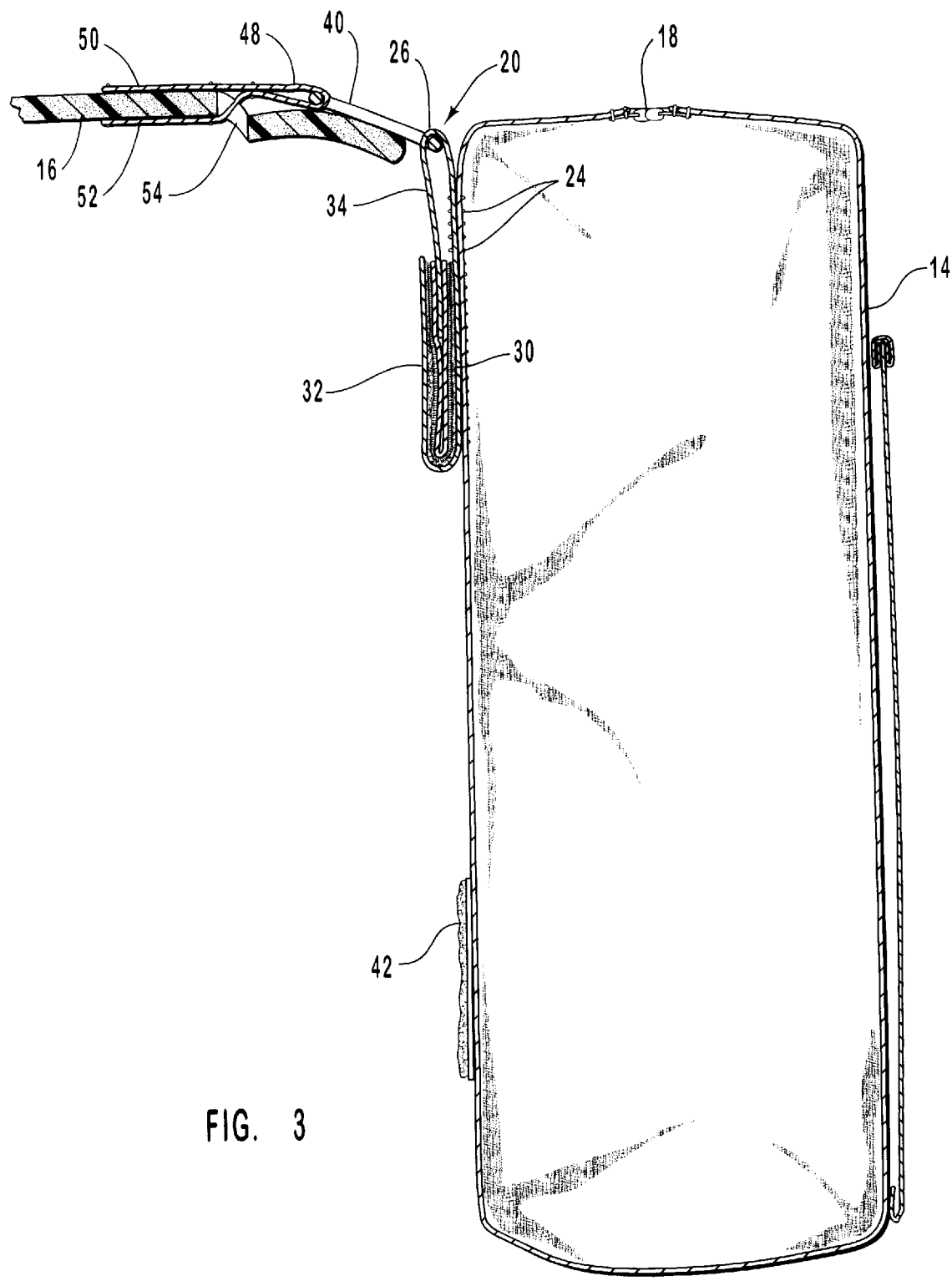
FIG. 3, a vertical section, taken on the line 3—3 of FIG. 1.

Referring now to the drawings:

In the illustrated preferred embodiment of the invention the bag system, shown generally at 10 includes a pair of carrying bags 12 and 14, interconnected by a shaped pad 16. The bags 12 and 14 are each formed as pouches with top zippers 18 providing access to the interior of the pouches.

A pair of spaced apart fastener strips 20 and 22 are each sewn at 24; intermediate their lengths to each bag 12 and 14. Each fastener strip 20 and 22 has a long free end 26 extending from one end of the intermediate sewn portion 24 and terminating on both front and back surfaces in hook portions 30. Each fastener strip also has a short free end 32 extending from an opposite end of the intermediate sewn portion. The front surface of the strip, from the hook portion to, and including the short free end is of a loop material 34. Each fastener strip 20 and 22 is formed into a loop 36 by turning a portion of the long free end 26 back over some or all of the intermediate sewn portion and connecting the hook portion 30 on the front surface of the strip to loop portion 34 on the front surface of the strip and then folding the short free end of the strip to be connected to the hook portion 30 on the back of the strip. The loops 36 may be formed through a D-ring 40, attached to the shaped pad 16 or may receive a belt or strap when the bag is to be attached to a support structure and is to be used without the shaped pad.

A strip 42 of hook or loop material is attached to the back surface of each bag 12 and 14 to be connected to a cooperating loop or hook material member bonded or otherwise attached to the support structure with which the bag system 10 is used.

Shaped pad 16 is made from a skid resistant, soft, durable and resilient material such as neoprene. As shown, the pad 16 is flat and generally rectangular in shape. Pad 16 has a central circular opening 44 that is made large enough to stretch over a saddle horn, a gas cap and filler spout of a motorcycle gas tank, or other such raised member of the support structure with which the bag system is used.

A pair of the spaced apart D-rings 40 are attached to each opposite end of the pad 16. Each D-ring is sewn into a loop 48, with tabs 50 and 52. Tab 50 is on one face of shaped pad 16 and tab 52 is inserted through a slot 54 formed in the shaped pad and tabs 50 and 52 are sewn together with material of the shaped pad 16 sandwiched between them.

Preferably, the opposite face surfaces of the pad 16 are of different colors. Thus, by merely disconnecting the bags 12 and 14 from the pad 16 and the insertion of the D-rings through the slots 54, the pad 16 can be turned over to present a different color appearance when the bags are reattached and the bag system is attached to a support structure. Whether the bag system 10 is used with the D-rings 40 inserted through the slots 54, or not, the pad 16 protects the support structure from abrasion resulting from rubbing of the D-rings on the surface of the support structure.

Although a preferred embodiment of the invention has been herein disclosed, it is to be understood that such disclosure is by way of example and that other variations are possible without departing from the subject matter coming within the scope of the following claims, which subject matter we regard as our invention.

I claim:

1. A multi-purpose bag system comprising a pair of pouch-type bags;

a resilient pad having a stretchable central opening therethrough and a pair of D-rings affixed thereto at opposite ends of said pad;

each said bag having means for releasable connection to a respective said pair of D-rings;

means to releasably connect each of said bags to a support structure; wherein, said central opening is configured to receive a support structure.

2. A multi-purpose bag system as in claim 1, wherein each means to releasably connect to said D-rings on each said bag comprises a strap sewn to the bag intermediate the length of each strap and having one of a hook and loop portion on both faces of one free end thereof and the other cooperating one of a hook and loop portion on the face of said strap remote from the bag.

3. A multi-purpose bag system as in claim 2, further including a slot through the pad adjacent each D-ring, whereby said D-ring is inserted through said slot and a reverse side of said pad is connected to said bags.

4. A multi-bag system as in claim 3, wherein the resilient pad is stretchable to extend the central opening over a raised portion of a support structure on which the bag system is used.

5. A multi-purpose bag system as in claim 4, wherein the support pad is made of Neoprene.

* * * * *